United States Patent [19]

Minard

[11] 3,942,850

[45] Mar. 9, 1976

[54] BEARING AND ASSEMBLY

[75] Inventor: James R. Minard, Keokuk, Iowa

[73] Assignee: Borg-Warner Corporation, Chicago, Ill.

[22] Filed: Sept. 6, 1974

[21] Appl. No.: 503,995

[52] U.S. Cl............................ 308/238; 308/DIG. 6
[51] Int. Cl.²......................................... F16C 27/06
[58] Field of Search....................... 308/238, DIG. 6

[56] References Cited
UNITED STATES PATENTS

| 3,606,505 | 9/1971 | Satterthwaite et al............. | 308/238 |
| 3,746,414 | 7/1973 | Sudyk et al......................... | 308/238 |
| 3,781,073 | 12/1973 | Jorn et al............................ | 308/238 |

*Primary Examiner*—Philip Goodman
*Assistant Examiner*—Richard A. Bertsch
*Attorney, Agent, or Firm*—Aubrey L. Burgess

[57] ABSTRACT

A bearing strip is especially adapted for use in a marine bearing or the like is constructed of an elongated shape of elastomeric material with substantially parallel faces and edges, the edges each having a groove therein, so that when bearing strips are placed adjacent one another in a housing to form a bearing, a spline or key is received in the adjacent grooves to retain the strips in the housing. The grooves are preferably reinforced by a metal member having an insert portion in the strip.

8 Claims, 9 Drawing Figures

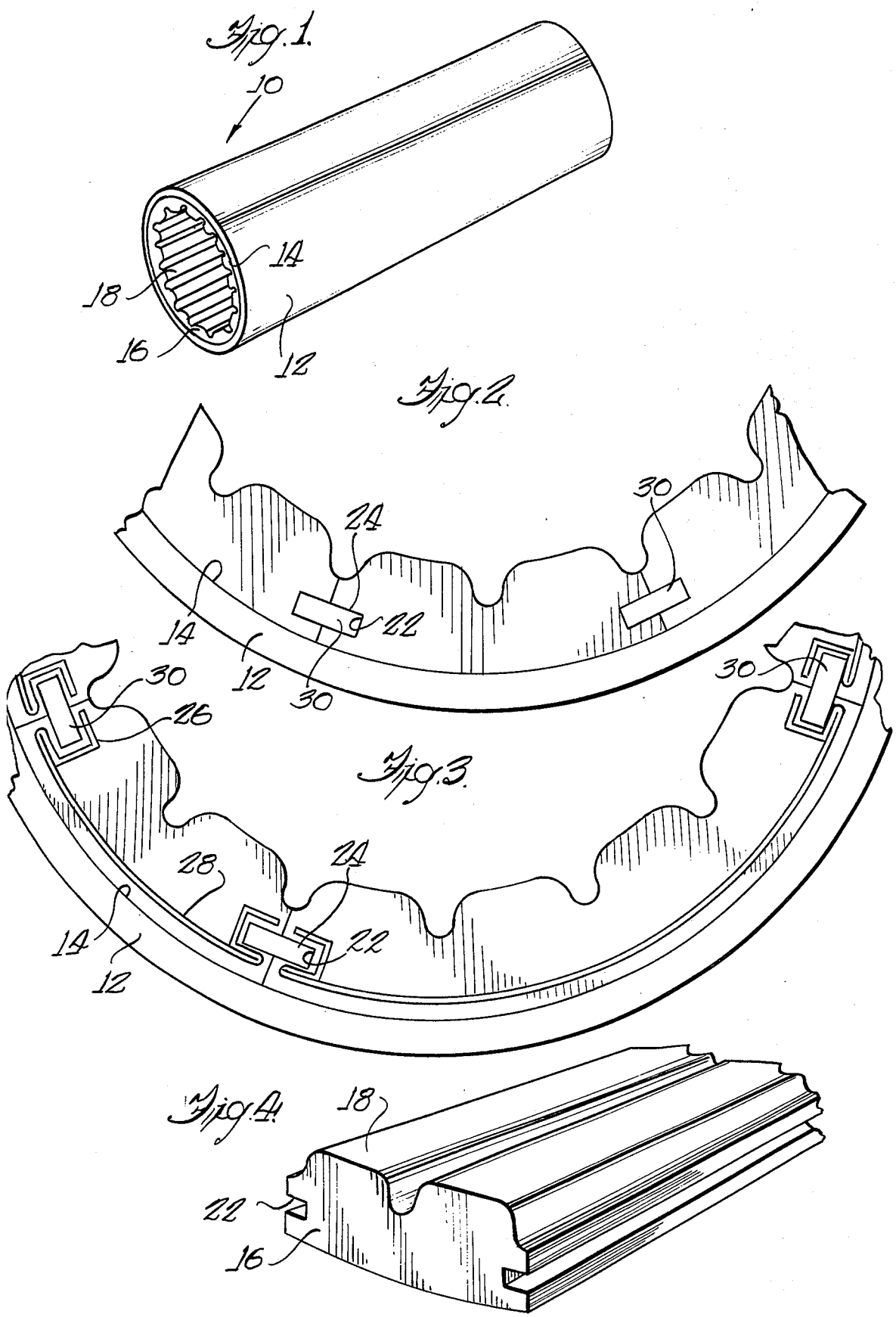

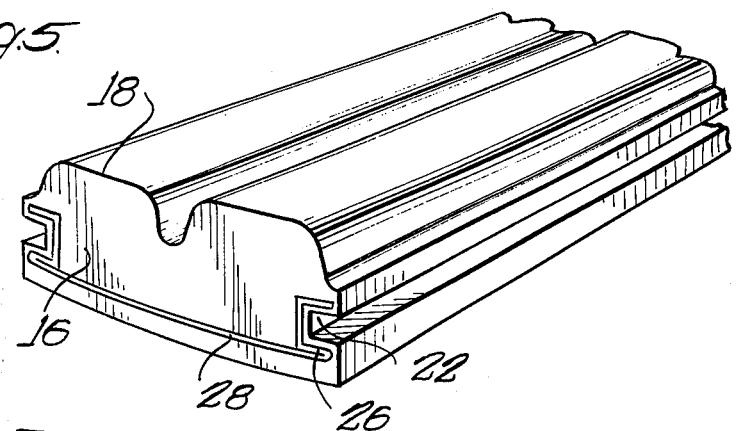
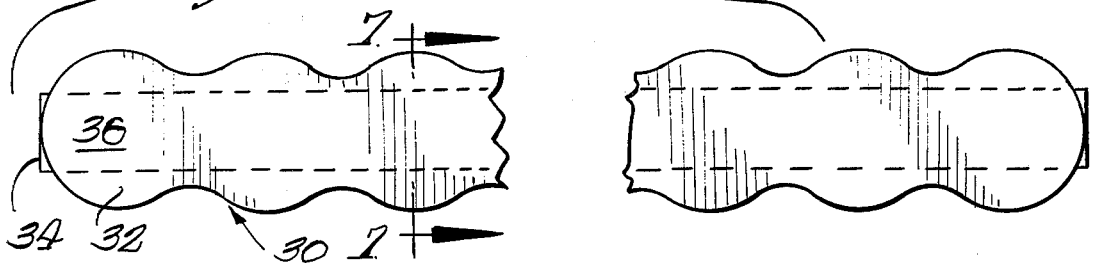
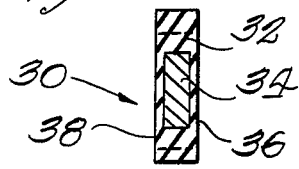
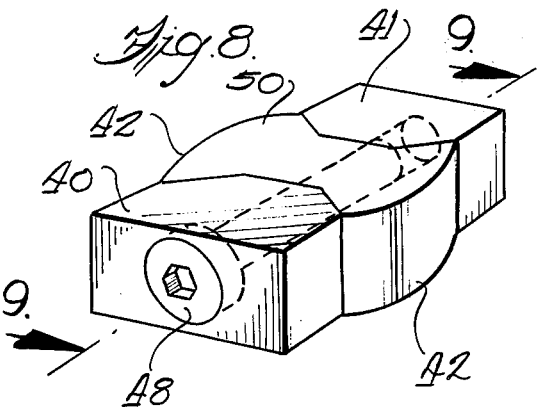
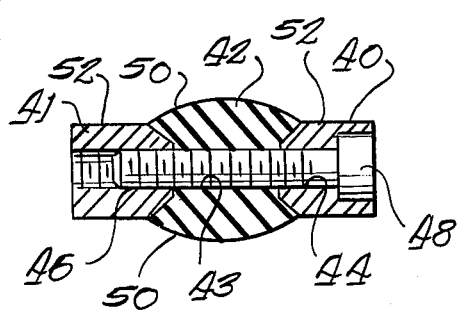

BEARING AND ASSEMBLY

BACKGROUND OF THE INVENTION

Bearing strips of elastomeric material and the bearings, as for example, marine bearings and the like, in which strips are used, are known in the art. In the prior art, the strips are retained in position by being received in grooves in the housing. The lands between the grooves may or may not be covered by elastomeric material and when so covered, the covering is relatively thin. If the lands are not covered, the strips may be wedged into the grooves by keys or the like centrally received therein.

THE INVENTION

According to this invention, a bearing strip, i.e., an elongated shape of elastomeric material, such as rubber, synthetic rubber, or the like, and usable in a generally cylindrical housing as a bearing assembly, is provided with grooves at each edge. When assembled in the housing, the grooves of adjacent strips align with one another to form a keyway, and a key is inserted in each keyway to retain the strips in the housing. Each groove, according to the preferred embodiment, is reinforced by a metal channel and the grooves of each strip are joined by a metal insert. The channels and the insert are preferably made of a single length of sheet metal shaped to provide the channels along the opposite edges thereof and are molded into the elastomeric strip. The elastomeric strip need not be molded with the insert; they may be provided with spaced metal channel inserts, or without metal channels.

The bearing surface of the strips can be flat or can be formed with longituderally extending ridges or in any other desirable pattern.

The keys are constructed to provide a compressive force to the bearing strips. One form of a key is an elastomeric length of material having a rigid insert, such as metal, hard plastic, or the like. Preferably, the longitudinal edges of such a key are formed with an undulating contour, with the top and bottom substantially flat, insuring the application of the compressive forces to the adjacent bearing strips. Another form of key is constructed to be adjustable, as for example, being a composite construction comprising a pair of spaced metal members separated by an elastomeric member with means to adjust the spacing of the metal members, resulting in a compressive force being applied to the elastomeric separator.

The structure herein described is useful as marine bearings, circular vibration isolation rings or similar application. Elastomeric bearings provide the necessary corrosion resistance for use in water and further provide resistance to abrasion from particles of foreign material. Lubrication is provided entirely by the operating medium, namely water, so that no further lubricant is required. The self-lubricating feature of such bearings makes it highly desirable for marine use for stern propeller shaft journals.

THE DRAWINGS

FIG. 1 is a perspective view of a marine bearing assembly made according to this insertion;

FIG. 2 is an enlarged end view of one form of bearing strip in a bearing housing;

FIG. 3 is an enlarged end view of another form of bearing strip in a bearing housing;

FIGS. 4 and 5 are perspective views of the bearing strips shown in FIGS. 2 and 3 respectively;

FIG. 6 is a plan view of one form of key;

FIG. 7 is a sectional view taken on line 7—7 of FIG. 6;

FIG. 8 is a plan view of another form of key; and

FIG. 9 is a sectional view taken on line 9—9 of FIG. 8.

DETAILED DESCRIPTION

In FIG. 1 there is illustrated a bearing 10, comprising a rigid bearing housing 12, usually of metal or other suitable material of the type used for marine purposes. The housing 12 is generally cylindrical having a central, circular bore 14 in which bearing strips 16 of elastomeric material, generally rubber or similar material, are inserted. The bearing strips 16 each are provided with one or more bearing surfaces 18 which are generally parallel to the logitudinal surface of the bore 14. Each bearing strip may have a continuous bearing surface 18 or an undulating surface, as is illustrated. In addition, the logitudinal edges of each strip are provided with grooves 22, so as to form a keyway 24 when adjacent strips are in edge to edge relationship. In the form of the strip illustrated in FIGS. 3 and 5, each groove 22 is reinforced by a metal channel 26 having an integral insert portion 28 extending between the channels.

In either form of bearing strip, a compression key, generally identified as 30, is received in each keyway 24. The key of FIGS. 6 and 7 comprises an elastomer member 32 having a central insert 34 which may be constructed of metal, hard plastic, or other suitable material. The elastomer member is constructed to have scalloped or undulating edges, so that when inserted, the material will be compressed. Generally the top and bottom surfaces 36 and 38 of this key are plane and parallel to one another; however, this need not be the case, if so desired. The other form of compression key (see FIGS. 8 and 9) comprises a pair of longitudinal rigid edge members 40 with a central, dividing elastomeric member 42 therebetween. By providing a series of boxes 44 from edge to edge of this structure, and having the bore in one of the members threaded as at 46, to receive a camscrew 48, the elastomeric member 42 may be compressed, so that its surface 50 extend outwardly of the surfaces 52 of the members 40 and thus when the key is inserted in the keyway 24, the adjacent strips are held in abutting relationship.

It has been found that a structure as described is economical to manufacture and has great integrity when assembled as described, insuring a long life without undue maintenance.

I claim:

1. A bearing strip for a bearing assembly comprising:
   an elongated strip of elastomeric material generally rectangular in section and having generally parallel faces and generally parallel edges;
   each edge having a longitudinal slot formed therein and extending substantially the length thereof;
   a metal insert in said strip reinforcing each slot;
   a metal member in said strip joining the metal inserts reinforcing said slots;
   a plurality of said strips being adapted for placement in a side-by-side relationship in a housing with adjacent of said edges facing and abutting one another and with adjacent of said slots in alignment with one another to form a keyway; and a key received in each slot to retain the strips in said housing.

2. A bearing assembly comprising:

a generally cylindrical bearing housing;

a plurality of elongated bearing strips of elastomeric material in edge-to-edge abutting relationship in said housing;

each bearing strip having generally parallel surfaces and generally parallel edges;

means defining a slot in the edges of each said strips, and the slots of adjacent strips being aligned with one another to define a keyway;

a metal channel in each slot reinforcing said slot;

a metal member connecting said metal channels in each strip; and a key member received in each keyway to retain said strips in said housing.

3. A bearing assembly comprising:

a generally cylindrical bearing housing;

a plurality of elongated bearing strips of elastomeric material in edge-to-edge abutting relationship in said housing;

each bearing strip having generally parallel surfaces and generally parallel edges;

means defining a slot in the edges of each said strips, and the slots of adjacent strips being aligned with one another to define a keyway; and a key member received in each keyway to retain said strips in said housing;

each key member comprising an elongated elastomeric member with a metal insert therein.

4. A bearing assembly as recited in claim 3 in which said elastomeric key member has a varying cross-section.

5. A bearing assembly as recited in claim 4 in which each key comprises elongated metal member joined by a centrally disposed elongated elastomeric member.

6. A bearing assembly as recited in claim 5 in which said key is so constructed and arranged to be adjustable in width.

7. A bearing assembly as recited in claim 3 in which said key is constructed of a pair of spaced metal members and an elastomer center member.

8. A bearing assembly as recited in claim 7 in which the width of said key is adjustable.

* * * * *